(12) United States Patent
Bohling et al.

(10) Patent No.: US 9,346,970 B2
(45) Date of Patent: May 24, 2016

(54) ADSORBING VINYL ACETATE BINDERS

(75) Inventors: James C. Bohling, Lansdale, PA (US); Qiaoqiao Cai, Shanghai (CN); Edwin H. Nungesser, Horsham, PA (US); Morris C. Wills, Lansdale, PA (US); Tingke Zhang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/398,487

(22) PCT Filed: May 4, 2012

(86) PCT No.: PCT/CN2012/075065
§ 371 (c)(1),
(2), (4) Date: Nov. 3, 2014

(87) PCT Pub. No.: WO2013/163808
PCT Pub. Date: Nov. 7, 2013

(65) Prior Publication Data
US 2015/0112016 A1 Apr. 23, 2015

(51) Int. Cl.
C08L 31/04 (2006.01)
C08L 43/02 (2006.01)
C09D 131/04 (2006.01)
C08F 2/22 (2006.01)
C09D 143/02 (2006.01)
C08F 220/60 (2006.01)
C08K 3/22 (2006.01)
C09D 7/12 (2006.01)

(52) U.S. Cl.
CPC .............. *C09D 131/04* (2013.01); *C08F 2/22* (2013.01); *C08F 220/60* (2013.01); *C08K 3/22* (2013.01); *C09D 7/1216* (2013.01); *C09D 143/02* (2013.01); *C08K 2003/2241* (2013.01); *C08L 2201/50* (2013.01); *C08L 2201/54* (2013.01)

(58) Field of Classification Search
CPC ................................ C08L 31/04; C08L 43/02
See application file for complete search history.

(56) References Cited

U.S. PATENT DOCUMENTS

| 6,710,161 | B2 | 3/2004 | Bardman et al. |
| 7,078,457 | B2 | 7/2006 | Amick et al. |
| 7,179,531 | B2 * | 2/2007 | Brown .................... C08F 2/001 428/407 |
| 7,459,496 | B2 | 12/2008 | Hsu et al. |
| 2003/0018103 | A1 | 1/2003 | Bardman et al. |

FOREIGN PATENT DOCUMENTS

| JP | 6128442 A | 5/1994 |
| JP | 7138521 A | 5/1995 |

* cited by examiner

*Primary Examiner* — Vu A Nguyen
(74) *Attorney, Agent, or Firm* — Reid S. Willis

(57) ABSTRACT

The present invention relates to a composition comprising and a method for preparing a stable aqueous dispersion of polymer particles comprising structural units of vinyl acetate and a phosphorous acid monomer. The composition of the present invention provides vinyl acetate/phosphorus acid based polymer particles that improve hiding efficiency in pigmented coatings formulations.

11 Claims, No Drawings

ADSORBING VINYL ACETATE BINDERS

BACKGROUND OF THE INVENTION

The present invention relates to polymers and copolymers of vinyl acetate, which are useful as binders in paint formulations.

Vinyl acetate polymers and copolymers are widely used as binders in architectural coatings formulations. These binders are relatively inexpensive, as compared to their acrylic counterparts, yet they have proven to be difficult to prepare as copolymers with pigment-adsorbing monomers such as phosphorus acid monomers or salts thereof. A conundrum can be surmised from U.S. Pat. No. 6,710,161, which teaches a distinct preference for copolymerizing a phosphorus acid monomer and a co-monomer at a pH of less than 2, and more preferably less than 1.5. The stated belief for the preference in carrying out the copolymerization reaction at a low pH (below the first $pK_a$ of the acid monomer) is that the phosphorus acid monomer is protonated and, therefore, less water soluble than it would be at higher pH; thus, polymerization of the protonated phosphorus acid monomer is believed to lead to increased incorporation of the monomer into the growing particle particles and a reduction of undesired water-soluble phosphorus acid polymer remaining in the reaction medium. Experimental results support this theory: A paint prepared using a poly-phosphoethyl methacrylate, methyl methacrylate, butyl acrylate binder prepared at pH 1.35 shows superior solvent resistance to a paint prepared using a binder made from the same monomer mix but at a pH of about 2.2.

The patent teaches, by inference, that adsorbing latexes of vinyl acetate and a phosphorus acid monomer should be exceedingly difficult to prepare: If polymerization of vinyl acetate and a phosphorus acid monomer were carried out at a pH above the first $pK_a$ of the phosphorus acid monomer (generally above 2), one would predict unacceptable levels of non-incorporated phosphorus acid oligomers or polymer in the aqueous phase; however, at low pH, vinyl acetate is known to hydrolyze.

U.S. Pat. No. 7,179,531 teaches a two-stage "acorn" copolymer comprising a crosslinked acrylic core containing structural units of phosphoethyl methacrylate, butyl acrylate, and methyl methacrylate protuberating from a (poly)vinyl acetate-butyl acrylate shell. Significantly, the core contains no structural units of vinyl acetate, which is known to hydrolyze under the low pH conditions of the first stage polymerization reaction. Therefore, no actual copolymers of phosphoethyl methacrylate and vinyl acetate were prepared in a single stage in this complex and costly 2-stage process.

It would therefore be an advance in the art of adsorbing latex polymers to find a way to make an adsorbing vinyl acetate latex-phosphorus acid polymer from concomitant polymerization of vinyl acetate and the phosphorus acid monomer without the aforementioned shortcomings.

SUMMARY OF THE INVENTION

The present invention addresses a need by providing, in one aspect, a composition comprising a stable aqueous dispersion of polymer particles comprising from 35 to 99.8 percent structural units of vinyl acetate and from 0.2 to 4 weight percent structural units of a phosphorus acid monomer or a salt thereof.

In a second aspect, the present invention is a method comprising the step of contacting under emulsion polymerization conditions an aqueous solution of from 0.2 to 4 weight percent of an at least partially neutralized phosphorus acid monomer and an aqueous solution of from 35 to 99.8 weight percent vinyl acetate to form a stable aqueous dispersion of polymer particles comprising structural units of vinyl acetate and the at least partially neutralized phosphorus acid monomer, wherein the weight percentages are based on the weight of total monomers.

The composition of the present invention provides vinyl acetate/phosphorus acid based polymer particles that improve hiding efficiency in pigmented coatings formulations.

DETAILED DESCRIPTION OF THE INVENTION

In a first aspect, the present invention is a composition comprising a stable aqueous dispersion of polymer particles comprising from 35 to 99.8 percent structural units of vinyl acetate and from 0.2 to 4 weight percent structural units of a phosphorus acid monomer or a salt thereof.

The term "stable aqueous dispersion of polymer particles" refers to copolymer particles of vinyl acetate and phosphoethyl methacrylate in a single phase.

As used herein, the term "structural units" refers to the remnant of the recited monomer after polymerization. For example, a structural unit of vinyl acetate is as illustrated:

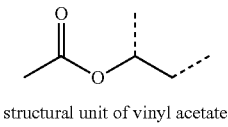

structural unit of vinyl acetate where the dotted lines represent the points of attachment of the structural unit to the polymer backbone. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates and methacrylates, including phosphoethyl methacrylate and phosphopropyl methacrylate, with phosphoethyl methacrylate being especially preferred. "Phosphoethyl methacrylate" (PEM) is used herein to refer to the following structure:

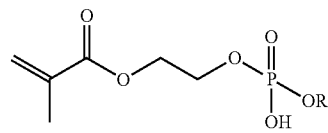

where R is H or

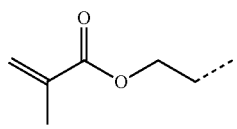

A preferred concentration of structural units of the phosphorus acid monomer, preferably PEM, is from 0.5 to 2 weight percent, based on the weight of the polymer particles.

The polymer particles preferably comprise 0.1 to 2.0 weight percent, based on the weight of the polymer particles, structural units of a sulfur acid monomer or a salt thereof. Examples of suitable sulfur acid monomers include sulfoethyl methacrylate, sulfopropyl methacrylate, vinyl sulfonic acid, 2-acrylamido-2-methyl propanesulfonic acid, and 2-methacrylamido-2-methyl propanesulfonic acid, and salts thereof. Preferred sulfur acid monomers are 2-acrylamido-2- methyl propanesulfonic acid and vinyl sulfonic acid, and salts thereof. The polymer particles more preferably comprise 0.5 to 1.5 weight percent, based on the weight of the polymer particles, structural units of 2-acrylamido-2-methyl propanesulfonic acid or a salt thereof.

The polymer particles are preferably film-forming at ambient temperature. As such, it is preferred that the polymer particles include structural units of monomers that reduce the $T_g$ of the polymer particles, as measured differential scanning calorimetry, to less than 20° C. Suitable monomers include from 10 to 64.8 weight percent, based on the weight percent of the polymer particles, structural units of acrylate monomers, preferably ethyl acrylate, butyl acrylate, or 2-ethylhexyl acrylate, or combinations thereof. More preferably, the polymer particles include 30 to 40 weight percent structural units of butyl acrylate, based on the weight of the polymer particles.

In another aspect the stable aqueous dispersion of polymer particles is contacted with a dispersion of pigment particles such as $TiO_2$ particles to form a dispersion of at least some of the polymer particles adsorbing to the surface of $TiO_2$ particles. As used herein, "adsorbing" refers to polymer particles contacting or attaching to the surface of the $TiO_2$ particles in a manner other than covalent bonding.

The aqueous dispersion of polymer particles can be prepared by forming an at least partially neutralized solution of the phosphorus acid monomer, then contacting the solution with vinyl acetate and optionally the sulfur acid monomer, or salt thereof, and/or the acrylate monomer under emulsion polymerization conditions. As used herein, the term "at least partially neutralized phosphorus acid monomer" refers to an aqueous solution of a phosphorus acid monomer containing not less than ½ the molar amount of neutralizing agent required to neutralize the monomer, up to the amount required to completely neutralized the monomer, preferably up to the amount required to reach a pH equal to the highest $pK_a$ (preferably the second $pK_a$) of the monomer. For example, if the neutralizing agent is ammonia, and the phosphorus acid monomer is PEM, the suitable molar ratio of ammonia to PEM would be at least 1:1 and preferably up to 2:1. Suitable neutralizing agents include, for example, ammonia, KOH, NaOH, ethanol amine, and aminomethyl propanol. It is preferred that pH of the aqueous solution of the phosphorus acid monomer, prior to contact with the vinyl acetate and optionally one or more additional monomers, be in the range of from 4.5, more preferably from 5.0, most preferably from 5.5; to 8.0, more preferably to 7.5, and most preferably to 7.2. The pH of the polymerization medium is maintained at such a level to minimize the hydrolysis of the vinyl acetate monomer or of the polymer, and is preferably buffered throughout the polymerization process to maintain a pH in the range of from 4.5, more preferably from 5.5; to 8, more preferably to 7. After the polymerization is complete, the consequent stable aqueous dispersion of polymer particles may be contacted with pigment particles to form a composite. In that case, the aqueous dispersion of polymer particles is advantageously adjusted to a pH in the range of 8 to 10 before, during, or after being contacted with the pigment particles, preferably an aqueous dispersion of $TiO_2$ particles, to form the composite of polymer particles and the pigment particles.

Because the polymerization reaction is carried out at a pH that does not promote the hydrolysis of vinyl acetate, very low levels of acetic acid or a salt thereof (i.e., the hydrolysis products of vinyl acetate) are formed during the polymerization process. Consequently, yields of useful polymer are improved, VOCs are reduced, and production of a less desirable hydrophilic polymer (due to generation of pendant OH groups as a consequence of hydrolysis) is reduced. Although it may be desirable to add some small amount (generally less than 500 ppm) of an acetate buffer to maintain the pH in the desired range during polymerization, the amount of acetic acid or a salt thereof generated is less than 5 weight percent, preferably less than 1 weight percent, more preferably less than 0.5 weight percent, and most preferably less than 0.1 weight percent, based on the weight of the vinyl acetate monomer.

The polymer particles preferably further comprise a substantial absence of structural units of methyl methacrylate and styrene, as well as a substantial absence of pendant OH groups. As used herein, "a substantial absence of structural units of methyl methacrylate and styrene" refers to a polymer comprising less than 5 weight percent, preferably less than 1 weight percent structural units of methyl methacrylate, and less than 5 weight percent, preferably less than 1 weight percent structural units of styrene. Similarly "a substantial absence of pendant OH groups" refers to a polymer comprising less than 5 weight percent pendant OH groups, preferably less than 1 weight percent pendant OH groups.

The composition of the present invention is useful as a binder in a coatings formulation such as a paint formulation. The binder is advantageously mixed with pigment, preferably $TiO_2$, or a formulation containing pigment, preferably under basic conditions, to form a composite of polymer particles and pigment particles with higher pigment efficiency. The formulation containing the composite may also include any of a variety of other materials such as solvents; fillers; rheology modifiers; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and neutralizing agents, such as hydroxides, amines, ammonia, and carbonates.

Abbreviations

| Abbreviation | Chemical name or description (% s in water are indicated) |
|---|---|
| FES-32 | Disponil FES-32 fatty ether sulfate (30% aq) |
| PEM | Phosphoethyl methacrylate, 60% active |
| aq $NH_3$ | Ammonia solution, base (29% aq) |
| FES-77 | Disponil FES-77 fatty ether sulfate (33% aq) |
| T 15-S-40* | TERGITOL ™ Secondary Alcohol Ethoxylate (70% aq) |
| DS4 | Rhodacal sodium dodecylbenzene sulfonate (22% aq) |
| Na-AMPS | Sodium 2-acrylamido-2-methyl-1-propane-sulfonate (50% aq) |
| BA | Butyl acrylate |
| VA | Vinyl acetate |
| IAA | Isoascorbic acid |
| tBHP | t-Butyl hydroperoxide |
| PS | Particle Size |
| Acet | Acetaldehyde |
| $TiO_2$ slurry | Ti-Pure R-746 $TiO_2$ |
| RM2020* | ACRYSOL ™ RM2020 Rheology Modifier |
| Natrosol | Natrosol Plus 330 HMHEC (4% aq) |
| CF-10* | TRITON ™ CF-10 Surfactant |
| AMP | 2-Amino-2-methyl-1-propanol |
| Foamaster | Foamaster VL Defoamer |
| Texanol | Coalescent |
| $TiO_2$ PVC | $TiO_2$ Pigment Volume Concentration of in the Paint |
| ROVACE 9900* | ROVACE ™ 9900 Emulsion Polymer |

*ROVACE, TRITON, ACRYSOL and TERTIGOL are Trademarks of The Dow Chemical Company or its Affiliates.

EXAMPLES

The following examples are for illustrative purposes only and are not intended to limit the scope of the invention.

Example 1

Preparation of BA/VA/PEM Latex

Deionized (DI) water (1331.8 g), FeSO$_4$ heptahydrate (0.05 g), and FES-32 (36.94 g) were charged to a 5-L 4-necked round bottom flask equipped with a mechanical stirrer, nitrogen gas blanket, thermometer, condenser, heating mantel and temperature controller. The reactor contents were heated to 72.5° C. The monomer emulsion was prepared by first mixing DI water (349.0 g) and PEM (34.10 g) in a vessel and adjusting the pH to 6.8 with NH$_3$ solution (19 g). FES-77 (27.38 g), T 15-S-40 (49.93 g), and DS-4 (32.55 g) were then added followed by BA (543.47 g), VA (1108.25 g) and Na-AMPS (38.36 g). The initiator solution was prepared separately by mixing DI water (194.2 g), t-BHP (7.31 g) and sodium acetate (NaOAc, 5.27 g). A separate solution of DI water (142.46 g) and IAA (7.54 g) was prepared along with a solution of DI water (54.60 g) and NaHSO$_3$ (2.27 g). The emulsion polymerization reaction was carried out by feeding the monomer emulsion of 2 h (20.39 g/min) with simultaneous feeds of both the tBHP initiator solution and the IAA solution over 3 h (0.83 g/min). The rest of the tBHP solution and the NaHSO$_3$ solution were then fed over 1 h (0.95 g/min). The reaction was maintained at 72.5° C. for the duration of the entire reaction (4 h total), after which time the latex was cooled to 40° C. The pH of the final latex was about 5.5 and was adjusted to 6.8 with aq. NH$_3$ (3.0 g).

Examples 2-5 and Comparative Example 1 were prepared substantially as described for Example except where indicated in Table 1.

been demonstrated that polymerization of VA and PEM, which can be carried out in a single stage at a pH in the range of 4.5 to 8, preferably in the range of 5.5 to 7, results in a dispersion of homogeneous polymer particles to provide a substantially grit-free formulation with enhanced pigment efficiency.

Procedure for Preparing Paint Samples

Binder was transferred into a 500-mL plastic container and mixed using a 3-blade pitched metal stirrer; 2-amino-2-methyl 1-propanol was added in a sufficient amount to achieve a pH of 8.5-9.5. After the addition of the base was complete, TiO$_2$ slurry was added to the binder with constant mixing. After the completion of the addition of the slurry, surfactant, defoamer, and thickener were added in sufficient amounts to reach a Krebs unit viscosity of at least 85.

After equilibration for at least 1 day, scattering measurements were made by casting the coatings onto a black release chart (Leneta RC-BC black release chart) using a 1.5-mil Bird applicator (6-inch wide). Additionally a thick paint film was cast using a 25-mil applicator (3-inch wide block type) onto a black release chart. The coatings were dried for at least 1 day and the Y reflectance of each dried coating was determined in replicate using a spectrophotometer (X-Rite corporation, Model Color I7). After measuring the reflectance, a 13-in$^2$ section was removed from the coating and weighed using an aluminum weighing pan on an analytical balance. The scattering per unit thickness (S/mil) was determined using the following calculation:

TABLE 1

VA/BA/PEM Latex Compositions

| | Composition | | | | Latex | | | | |
|---|---|---|---|---|---|---|---|---|---|
| Ex. # | BA | VA | PEM$^a$ | AMPS$^b$ | Latex Solids | PS (nm) | VA (ppm) | Acet (ppm) | Total (ppm) |
| 1 | 31.88% | 65.00% | 2.00% | 1.13% | 44.3% | 110 | 131 | 316 | 447 |
| 2 | 33.22% | 63.72% | 1.96% | 1.10% | 43.3% | 109 | 448 | 404 | 852 |
| 3 | 0.00% | 96.88% | 2.00% | 1.13% | 44.3% | 154 | 25 | 318 | 343 |
| 4 | 33.00% | 65.00% | 2.00% | 0.00% | 44.4% | 121 | 108 | 454 | 562 |
| 5 | 61.88% | 35.00% | 2.00% | 1.13% | 40.6% | 119 | 1330 | 350 | 1680 |
| Comp. 1 | 33.88% | 65.00% | 0.00% | 1.13% | 39.1% | 121 | 68 | 34 | 102 |

$^a$% PEM is uncorrected for active amount, which is ~60% of the reported percentage
$^b$% reported reflects actual concentration of active material The Examples indicate that stable latexes can be prepared using a range of VA varying from about 35 to about 97 weight percent and BA varying from about 32 to about 62 weight percent. It was more difficult if not impossible to prepare such latexes at a VA concentration of less than 35 percent (BA greater than 62%) in the presence of PEM because such latexes readily coagulated during polymerization, rendering them unusable. Moreover, attempts to make latexes at pH lower than 4.5 proved impossible because of extensive gellation.

It has surprisingly been discovered that stable latexes containing VA and PEM or VA, BA, and PEM can be prepared at a pH considerably higher than what was previously thought to be feasible. U.S. Pat. No. 6,710,161 teaches that low pH polymerization is necessary to avoid extensive partitioning of phosphorus acid oligomers or polymers into the aqueous phase, which leads to the production of unacceptable levels of grit in paint formulations. Since acidic solutions promote the hydrolysis of vinyl acrylate, it would seem difficult, if not impossible to form stable latexes incorporating phosphorus acid monomers (such as PEM) and VA. Nevertheless, it has $$S = \frac{R}{X \times (1 - R^2)} \times \ln \frac{1 - (R_B \times R)}{1 - \frac{R_B}{R}}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A).

$$X(\text{mils}) = \frac{W_{pf}(\text{g}) \times 1000(\text{mil/in})}{D(\text{lbs/gal}) \times 1.964(\text{g/in}^3/\text{lbs/gal}) \times A(\text{in})}$$

Tables 2 and 3 show S/mil comparisons for paint formulations with and without PEM-containing binder. The volume solids for the formulations in Table 2 and Table 3 are 32.2 and 31.5 respectively. Examples 2a-5a are paint formulations using binders from Example 2-5; Comparative Example 1a is a formulation using the binder from Comparative Example 1;

and Comparative Examples 2 and 3 are paint formulations using the commercial binder ROVACE™ 9900 emulsion polymer, which is a polyVA binder that does not contain PEM.

TABLE 2

Hiding Comparisons For Paints With and Without PEM-Containing Binder

| Material | Comp. 2 | Comp. 3 | Example 2a | Example 3a |
|---|---|---|---|---|
| Binder | 9900 | 9900 | Example 2 | Example 3 |
| TiO$_2$ PVC | 20.55 | 23.60 | 20.98 | 20.81 |
| Binder amount (g) | 216.4 | 207.59 | 279.4 | 288.9 |
| AMP (g) | 0.32 | 0.37 | 1.03 | 0.67 |
| TiO$_2$ slurry (g) | 147.09 | 169.09 | 150.9 | 150.0 |
| CF-10 (g) | 1.0 | 1.0 | 1.0 | 1.0 |
| Foamaster (g) | 0.50 | 0.50 | 0.5 | 0.5 |
| Texanol (g) | 0.80 | 0.80 | 8.5 | 8.4 |
| Natrosol (g) | 50.0 | 50.0 | 56.0 | 50.0 |
| RM-2020 | 14.5 | 15.4 | 0 | 3.9 |
| Water (g) | 84.55 | 81.9 | 24.3 | 19.8 |
| KU viscosity | 85.3 | 86.7 | 96 | 99 |
| PH | 8.26 | 8.47 | 8.5 | 8.4 |
| S/mil | 6.55 | 7.11 | 7.33 | 7.86 |
| Std | 0.03 | 0.05 | 0.06 | 0.05 |

TABLE 3

Hiding Comparisons For Paints With and Without PEM-Containing Binder

| Material | Comp. 1a | Example 4a | Example 5a |
|---|---|---|---|
| Binder | Comp. Ex 1 | Example 4 | Example 5 |
| TiO$_2$ PVC | 20.82 | 20.81 | 20.81 |
| Binder (g) | 306.15 | 269.21 | 283.79 |
| AMP (g) | 0.18 | 0.93 | 0.78 |
| TiO$_2$ slurry (g) | 147.18 | 147.09 | 147.09 |
| CF-10 (g) | 1.0 | 1.0 | 1.0 |
| Foamaster VL (g) | 0.50 | 0.50 | 0.50 |
| Texanol (g) | 0.80 | 0.80 | 0.80 |
| Natrosol (g) | 50.0 | 50.0 | 50.0 |
| RM-2020 (g) | 3.6 | 4.1 | 3.8 |
| Water (g) | 6.7 | 42.1 | 23.9 |
| KU viscosity | 92.6 | 93.6 | 93.6 |
| pH | 8.41 | 8.55 | 8.47 |
| S/mil | 5.80 | 7.34 | 7.29 |
| Std | 0.10 | 0.07 | 0.01 |

The data show that at any given PVC in the paint, the formulations of the present invention (i.e., the formulations with PEM-containing binder) give improved hiding across the board as demonstrated by increased S/mil values over the comparative formulations. Surprisingly, the hiding for the formulations with PEM-containing binder are even higher than for the Comparative Example 3 formulation, which has a PVC>10% higher than the PVCs of the formulations of the examples of the present invention.

The composition of the present invention is useful in coatings formulations for a variety of substrates including metal, plastic, concrete, wood, asphalt, hair, paper, leather, rubber, foam, and textiles.

The invention claimed is:

1. A composition comprising a stable aqueous dispersion of polymer particles comprising, based on the weight of the polymer, from 35 to 99.8 weight percent structural units of vinyl acetate and from 0.2 to 4 weight percent structural units of phosphoethyl methacrylate or a salt thereof.

2. The composition of claim 1 which is further characterized by having less than 5.0 percent by weight acetic acid or a salt thereof based on the weight of structural units of vinyl acetate.

3. The composition of claim 2 wherein the polymer particles further comprise from 0.1 to 2.0 weight percent, based on the weight of the polymer particles, structural units of a sulfur acid monomer or a salt thereof and wherein the stable aqueous dispersion is further characterized by having less than 1.0 percent by weight acetic acid or a salt thereof based on the weight of structural units of vinyl acetate.

4. The composition of claim 3 wherein the polymer particles further comprise, based on the weight of the polymer, from 10 to 64.8 weight percent structural units of an acrylate monomer and wherein the structural units of the sulfur acid monomer are structural units 2-acrylamido-2-methylpropane sulfonic acid or sodium vinyl sulfonate or a salt thereof or a combination thereof.

5. The composition of claim 4 wherein the acrylate monomer is ethyl acrylate, butyl acrylate, or 2-ethylhexyl acrylate, or a combination thereof.

6. The composition of claim 1 wherein the polymer particles comprise from 30 to 40 weight percent structural units of butyl acrylate, based on the weight of the polymer.

7. The composition of claim 1 wherein the polymer particles further comprise a substantial absence of structural units of methyl methacrylate and styrene, as well as a substantial absence of pendant OH groups.

8. The composition of claim 1 which further comprises TiO$_2$ particles, wherein at least some of the polymer particles adsorb onto the surface of the TiO$_2$ particles.

9. A composition comprising a stable aqueous dispersion of particales of a polymer comprising form 35 to 99.8 weight percent structural units of vinyl acetate and from 0.2 to 4 weight percent structural units of a phosphorus acid monomer or a salt thereof, based on the weight of the polymer.

10. The composition of claim 9 wherein the polymer further comprises from 0.1 to 1.5 weight percent structural units of a sulfur acid monomer or a salt thereof.

11. The composition of claim 9 wherein the polymer further comprises a substantial absence of structural units of methyl methacrylate.

* * * * *